United States Patent
Prajescu et al.

(10) Patent No.: US 8,725,454 B2
(45) Date of Patent: May 13, 2014

(54) DRYING METHOD WITH ENERGY SAVINGS

(75) Inventors: Ionelia Silvia Prajescu, Santiago de Queretaro (MX); Sebastièn Beaulac, Santiago de Queretaro (MX)

(73) Assignee: Mabe, S.A. DE C.V., Queretaro (MX)

( * ) Notice: Subject to any disclaimer, the term of this patent is extended or adjusted under 35 U.S.C. 154(b) by 333 days.

(21) Appl. No.: 13/091,499

(22) Filed: Apr. 21, 2011

(65) Prior Publication Data

US 2012/0022830 A1 Jan. 26, 2012

(30) Foreign Application Priority Data

Jul. 23, 2010 (MX) .................. MX/A/2010/008115

(51) Int. Cl.
*G04F 13/00* (2006.01)
*F26B 19/00* (2006.01)

(52) U.S. Cl.
USPC ........................................... 702/176; 34/562

(58) Field of Classification Search
USPC ............................................. 702/176, 57, 64
See application file for complete search history.

(56) References Cited

U.S. PATENT DOCUMENTS

| | | | |
|---|---|---|---|
| 5,454,171 A | 10/1995 | Ikeda et al. | |
| 6,122,840 A * | 9/2000 | Chbat et al. | 34/496 |
| 6,199,300 B1 | 3/2001 | Heater et al. | |
| 6,519,871 B2 * | 2/2003 | Gardner et al. | 34/497 |
| 6,700,102 B2 | 3/2004 | St. Louis | |
| 6,822,201 B2 | 11/2004 | Park | |
| 6,845,290 B1 * | 1/2005 | Wunderlin et al. | 700/208 |
| 7,322,126 B2 * | 1/2008 | Beaulac | 34/554 |
| 7,571,553 B2 * | 8/2009 | Joerger et al. | 34/378 |
| 7,765,715 B2 * | 8/2010 | Kim | 34/491 |
| 7,941,937 B2 * | 5/2011 | Do | 34/381 |
| 2002/0000049 A1 * | 1/2002 | Woerdehoff et al. | 34/313 |
| 2007/0251119 A1 | 11/2007 | Kim et al. | |

FOREIGN PATENT DOCUMENTS

| | | |
|---|---|---|
| CN | 17515544 | 1/2006 |
| ES | 2212436 | 7/2004 |
| JP | 1131699 | 5/1989 |
| JP | 10043499 A | 2/1998 |
| JP | 2005245489 | 9/2005 |

* cited by examiner

*Primary Examiner* — Sujoy Kundu
*Assistant Examiner* — Ricky Ngon
(74) *Attorney, Agent, or Firm* — Enrique J. Mora; Reusse Wolter Sanks Mora & Maire, P.A.

(57) ABSTRACT

A method to compensate drying time in an electric or gas dryer machine, which comprises the steps of: read the operator parameters (dryness level, cycle type, heat level); begin a timer to measure time between beginning and Trtv; determine the load weight and the type of restrictions of the dryer; determine the dryness target voltage and the minimum drying time by means of a table of predetermined values based on the previous data; store the values in a memory; determine that the detected voltage be equal to the target voltage; calculate the additional time as a function of the heat factor and of the data previously determined; compare (Tminimum-Trtv) versus additional time and use the greater; and, add the additional time to the Trtv as compensation time.

5 Claims, 6 Drawing Sheets

DRYING METHOD WITH ENERGY SAVINGS

RELATED APPLICATIONS

This application claims priority from Mexican application Ser. No. MX/a/2010/008115 filed Jul. 23, 2010, which is incorporated herein by reference in its entirety.

FIELD OF INVENTION

The present invention relates to household appliances used to dry textile articles, and more particularly to a dryer which uses controls based on a processor to control the drying operation and to a method which adds additional drying time to the dryer.

BACKGROUND

Generally, a dryer is provided to dry a wet object (like for example, wet textiles). The wet objects will be referred from now on as "textiles" or "clothes", without being limited to just these only.

It is common practice to detect the level of moisture of the textiles in a rotating drum using moisture detectors provided on the drum and/or on a fluff duct and/or on an exit duct. A voltage signal of the moisture detector of the articles being washed is used based on the actual characteristics of the textile load being dried. That is, a measurement of electric resistance of the mentioned clothes is used: if the clothes contain water within their fibers, it is capable of conducting electricity, whereas if the clothes are dry and contain no water, it is not capable of conducting electricity and its electric resistance increases. The detectors are tested periodically to provide voltage values which are filtered, cleaned and input into a processor which contains a module to determine when the clothes are dry, almost dry or attain a desired level of moisture content and a module to determine when the drying cycle should cease.

The low effectiveness of the detector in determining with exactness the moisture content of the textiles being dried is common in these types of measurements, since sensitivity is lost when the clothes are almost dry or when the textile load is small. Thus the voltage signal of the moisture detector can be highly variable during the drying time and it can be that it does not accurately detect the exact moisture content of the textiles or clothes being dried. The articles can, from time to time, come into contact with the electrodes of the moisture detector and sometimes not be in contact with the electrodes, given the random rotation patterns of the textiles and given small loads.

As can be supposed, another factor which affects the detector's exactness in detecting the moisture level occurs when the textiles are not dried in a uniform manner. That is, some portions of the textiles may be more humid than other portions of the textiles, and the more humid portions cannot be detected with exactness by the detectors.

Thus, in order to avoid having parts of the clothes which are damp at the end of the cycle, the dryer extrapolates the drying time after the moisture level where the sensitivity of the measure is reduced, adding or lessening the drying time. The risk in drying cycles which save energy is that the clothes may not be sufficiently dried because the added time or the lessened time is not adequate, or rather, takes longer time and thus more energy than that which is necessary to dry during the drying cycles. Thus a processor is provided to calculate and compensate times in a precise manner and to predict the required drying time for the drying cycle. The problem therefore, is to provide for the dryer the flexibility to adjust the cycle time as a function of certain factors, such as the heat factor and the operation time of the dryer, the time necessary to achieve certain voltages, and weight determination: these factors themselves are a function of other factors. The benefit of the problem to be resolved is to have dry clothes at the conclusion of the drying cycle, in light of the predetermined or selected heat level selected by the user, in light of the user's cycle selection, the size of the load, the restrictions and the energy level, allowing a lesser level of energy consumption and the operator's satisfaction in attaining proper drying of the textiles in the dryer.

In the area, similar processes to determine certain drying aspects of a dryer are known. For example, Chinese patent number 1 715 544 makes known a control method for regulating the heater and the fan based on the drum's internal conditions, such as temperature and moisture to allow a microprocessor to regulate the heater and the fan, thus allowing for a drying time shortening.

Spanish patent number 2 212 436 makes known a process which watches the flow velocity of an air process current generated by a fan in an air channel and heated via a heating system in a household clothes dryer where the air process temperature is collected at a certain point situated in the current flow, after the heating system, characterized because the heating power of the heating system is changed, the provoked temperature variation is collected in this manner in the current flow of the air process in at least one point, and the difference in the moments where the temperature difference is collected of the current flow of the air process is a first point or a second point, respectively, or between the moments where the heating potential variation is collected or the temperature variation of the current flow of the air process at a second point, and is used as a measurement of the velocity of the current flow of the air process.

Japanese publication number 1131699 makes known that an energy source of the semi-conducting heater is an energy source of constant voltage, where the energizing is controlled to set the heater's energy consumption. When the dryer ends, the heater is turned off and shuts down the dryer's motor. Under the control, actual energy consumption is always maintained to be a desired energy consumption by the control phase through the surrounding temperature etc. is varied, the energy consumption is constant. Afterwards, when it is controlled in order to maximize the allowed energy consumption at a determined state, the heater always operates at maximum energy consumption without relating it to the surrounding temperature. As a result, the heater's ability is always set at the maximum in order to reduce the clothes' drying time.

Japanese publication number 2005245489 makes known a dryer provided with a rotating drum, an air entry section with a heater, an air exit section with a fan, an exit temperature detector placed in the exit section and a control which controls heat. The clothes are dried by adjusting the exiting air temperature to a pre-described temperature given the exiting air's temperature detected by the temperature detector in the control and controlling the heater. The clothes drying process controlling the dryer is composed by a multiple number of drying time length with a pre-described temperature which is sequentially low and a drying time of each drying time length being predetermined. It is desired that the set temperature for the last drying time length be approximately similar to the cooling temperature required during the cooling process.

U.S. Pat. No. 5,454,171 makes known a dryer which includes a drum which shuffles the clothes to be dried, a heater and a fan to provide hot air in the drum during the drying process, and a temperature detector which detects temperature in the drum. The drying process includes a drying step in which hot air is fed to the drum and a cooling step in which the heater is de-energized. The intermittent operation is started once the drying process is completed. The intermittent operation is completed once the temperature detected by the temperature detector has achieved a predetermined value to prevent the clothes from getting wrinkled.

U.S. Pat. No. 6,199,300 makes known a method and apparatus to control a dryer's heat entry where the initial heat for a load of clothes is set at maximum power until a temperature condition or predetermined time takes place. The dryer's heat entry is reduced to reduce energy consumption while effectively removing moisture of the load of clothes. When the moisture content of the load of clothes falls to a predetermined quantity, the maximum heat entry is applied once again to remove the remaining moisture of the load of clothes.

U.S. Pat. No. 6,700,102 makes known a control circuit which operates with a supply of energy of 120 volts which compensates for the surrounding temperature changes to compensate for premature advancement of the chronometer of the dryer's motor during a automatic drying cycle.

U.S. Pat. No. 6,822,201 makes known a dryer which has a control circuit of the heater to control the impulse of a dryer which uses one of a plurality of high voltages, which uses a circuit realized by a relay form of contact in C set between a micro-computer exit and a plurality of heater impulsions, so that the heater's impulse capacity be assured even when the current exit fails, and to avoid short circuit conditions even when the micro-computer has logical mal-functions.

US publication number 2007/0251119 makes known a dryer and a control method for the same dryer, through which the maintenance of energy savings and optimal temperature within the drum are equipped in a way to diversify the heater's temperature, varying the fan's rotational velocity used by the dryer. A drying drum is included to shuffle the objects to be dried, a fan is provided to provide air to pass through the drying drum, a heater to heat air supplied to the drying drum, an impulses motor which generates an impulse force to rotate the drum and the fan and a control unit which controls the motor's RPMs to be varied according to the results detected by the temperature detector.

U.S. Pat. No. 7,322,126 makes known a clothes dryer which has a control system for degrees of dryness which is responsive to the moisture level of the clothing articles rotating in a drum and an objective moisture value to control the drying cycle of the dryer. The cycle has a producing module with a parameter size of the load and a module of parameter of detection of air flow. These two modules generate one of two conditions of parameters used by the processor to modify or select a desired value of appropriate moisture. The producing module of desired size parameter generates a small load parameter and a large load parameter. The module of air flow detection produces one of first or second parameters of air flow to be used in the processor of drying degree. As a result, the processor selects one of four moisture values among these conditions.

BRIEF DESCRIPTION OF THE INVENTION

The following lines shall describe the common layout of dryers. This layout can change and is not subject to being set as below mentioned, but previous art must be taken into account with the differing layouts of dryers. It is highlighted, that the layout of the parts of a dryer are not the objective of the present invention, but rather, the functions of the parts are the objective.

Dryers can include a cabinet or main casing, a front panel, a back panel, a pair of lateral panels spaced between them by the front and back panels and an upper cover. Within the casing, a drum or container is found mounted for rotation around a substantially horizontal axis. A motor rotates the drum in the horizontal axis by means of, for example, a pulley and a band. The drum generally has a cylindrical shape, is has a cylindrical perforated outer wall and is enclosed in its front by a wall which defines an opening in the drum. The articles of clothing and other textiles are introduced into the drum through the opening. A plurality of dumping ribs are found within the drum to raise the articles and later allow them to be dumped again to the drum's lower part while the drum rotates. The drum includes a back wall which is supported in a rotating manner within the main casing by an adequate fixed bearing. The back wall includes a plurality of holes which receive hot air which has been treated by a heating means, such as a combustion chamber and a back duct. The combustion chamber receives air at room temperature via an entrance. Dryers can be gas and/or electric, where the electric ones have heating resistance elements found in the heating chamber positioned next to the outer perforated cylindrical wall which would replace the combustion chamber and the back duct of a gas dryer. The heated air is suctioned from the drum by a fan, same which is driven by the motor. The air passes through a filter screen which traps any type of felt particles. While the air passes through the filter screen a trap duct seal enters and it is passed outwards of the clothes dryer through an exit duct. After the articles have been dried, they are removed from the drum via the opening.

A moisture detector is used to predict the percentage of moisture content or dryness level of the articles in the container. The moisture detector typically comprises a pair of spaced bars or electrodes and also comprises circuits to provide a representation of the voltage signal of the moisture content of the articles to an electric control based on the electric resistance or ohms of the articles. The moisture detector is located on the inner lower front wall of the drum and alternatively they have been mounted on the back part of drum's wall when this wall is in resting phase. The signal from the detector can be chosen to provide a continual representation of the moisture content of the articles within an adequate range to be processed by the electric control.

The textiles being dumped within the dryer's drum, randomly contact the spaced electrodes of the stationary moisture detector, so that the textiles are intermittently in contact with the detector's electrodes. The length of time of contact between the textiles and the detector's electrodes depends on various factors, such as the rotational velocity of the drum, the type of textile, the quantity or volume of clothes in the drum and the air flow through the drum. When the wet textiles are in the dryer's drum and in contact with the detector's electrodes, the resistance through the detector is low. When the textiles are dry and contact the detector's electrodes, the resistance through the detector is high and indicative of a dry load. However, situations can exist which can result in erroneous indications of the actual dryness level of the articles. For example, in a situation when the wet textiles are not in contact with the detectors, like for example in the case of a small load, the resistance through the detector is very high (open circuit), which would be falsely indicative of a dry load. Additionally if a conductive portion of dry textiles, like for example a button or a metal zipper contacts the detector's electrodes, the resistance of the detector would be low, which would be falsely indicative of a wet load. Thus when the textiles are wet there can be times when the detector can erroneously detect a dry condition (high resistance) and, when the textiles are dry, there can be times when the detector erroneously detects a wet condition (low resistance).

The reduction and smoothing of noise is provided by an electric controller which has a more accurate and trusted detection method of the actual dryness of the articles and results in a more certain and trusted control of the dryness operation. However, the noise reduction per se does not completely compensate for the size variations of the load or the different dryers which have differing air flow restrictions in light of differing fan systems.

The electric control responds to a voltage signal of the moisture detector and predicts a percentage of moisture content or degree of dryness of the articles in the container as a function of the resistance of the articles. As is previously suggested, the value of the voltage signal administered by the moisture detector is related to the moisture content of the textiles.

The electric control is also coupled with an entering temperature detector, such as, for example, a thermostat. The entering temperature detector is mounted to the dryer on the air flow entering the drum. The entering temperature detector detects the temperature which enters the drum and sends a corresponding temperature signal to the electric control. The electric control is also coupled to the exiting temperature detector which detects the air temperature exiting the drum and sends a corresponding temperature signal to the electric control. The electric control interprets these signals to generate an air flow parameter based on the entering temperature increase and/or a size of load parameter based on the exiting temperature increase. These parameters, among others, are used to select an objective moisture signal, which in turn is used by the controller in conjunction with the filtered and/or reduced noise voltage signal of the moisture detector to control the dryer's operation, in order to obtain a target voltage signal or objective moisture.

The electric control comprises an analog to digital converter (A/D) to receive the signal representations sent by the moisture detector. The signal representation of the A/D converter and a counter/timer is sent to a central processing unit (CPU) for greater processing of the signal which shall be described below in greater detail. The CPU also receives the entering and exiting temperature signals respectively of the temperature detectors via two distinct analog to digital converters (A/D). The CPU receives energy from a source of energy, comprises one or more processing modules stored in an adequate memory device, such as a reading only memory ROM, to predict a moisture percentage content or degree of dryness of the textile articles in the container as a function of the electric resistance of the articles, as well as to process elapsed time and add an additional time. Once it has been determined that the textile articles have reached a desired dryness level, then the CPU sends respective signals to an entry/exit module which in turn sends respective signals to de-energize the motor and/or the heating means. An electronic inter phase and display panel allow the user to program the dryer's operation and additionally allows for monitoring the respective cycle progression of the dryer's operation.

The CPU and the ROM can be configured to comprise a dryer processor. The processor estimates the detention time and controls the dryer's detention based on a moisture signal received from the moisture detector, in the time lapsed and in the additional time. The processor filters the moisture signal, same which can be a voltage signal and compares this to the objective moisture signal to control the dryer's operation. The processor selects a target voltage signal—or objective moisture—from a table of objective moisture signals.

When the textiles touch the detector's electrodes and the voltage decays through the detector's electrodes, it therefore decreases to a lower value which is indicative of the textiles' moisture content. However, if the textiles do not contact the detector's electrodes for a prolonged period of time to overcome the responding time proposed associated with the detector's electrodes, then the signal reading does not reach its stable value state. For small loads, it is noted that the minimums are farther away from the real moisture level of the load in comparison to the larger loads on the curve. However, the curve inclination immediately preceding the minimum for small loads is usually more inclined than the heavier loads. The electric control and/or the processor detect the voltage signal minimums of the electrode detector and the gradient immediately preceding the minimum. The processor and/or electric control use this information to extrapolate the pre-set moisture signals for each minimum and/or maximum. When it is obtained that the voltage signal sent is equal to, or during a determined time an average equal to the targetvoltage, this information is extrapolated to add an extra set amount of time. The processor calculates and compensates times and predicts the additional drying time required by the drying cycle.

Thus, in the present invention a drying cycle is proposed during which within the same, the additional drying time of the cycle can be estimated and in this way, it can be adjusted to provide correct and uniform drying of the textiles.

The effectiveness of the moisture detector to determine the moisture content of the load being dried is an important factor in the detection of dryness. With the goal of not having damp parts of the load at the end of the drying cycle, the dryer extrapolates the drying time after the voltage signal obtained from the moisture detector has been equaled to the target voltage, same which represents the level where the moisture detector loses sensitivity.

The risk in energy saving drying cycles is that the load not be sufficiently dry because the minimum time or the time to reach target value, Trtv, is not adequate and in the same manner that the additional time take more time and consequently more energy than that which is necessary to dry.

Thus, the processor calculates and compensates times in a precise manner to predict the minimum drying time and the additional time. The problem, therefore, is to provide the dryer the flexibility to adjust the cycle time by means of the target voltage calculations and the minimum amount of time as a function of the factors previously mentioned, such as the type of dryer, the dryness level, the restrictions, the type of cycle, and the load weight, among other factors; as well as adjusting the cycle time by means of calculations of additional time as a function of the factors previously mentioned, such as the heat factor, the type of dryer, the minimum time or the time to reach target value, the Trtv, the multiplier and the aggregate. The benefit of the problem to be solved is to have dry clothes at the end of the cycle, despite the predetermined heat level or that selected by the operator, allowing the use of the lowest level of energy consumption and the overall satisfaction of a proper dryness of the load within the dryer.

Thus, the drying cycle of the present invention allows for minimum time estimation of the cycle and adjustment of the additional time of the cycle to arrive at correct and uniform dryness of the load.

In this way, in the time compensation method for a clothes dryer of the present invention, the drying cycle is begun once the operator has selected from the dryer's control panel a type of cycle and a desired dryness level for the clothes to be dried. Once the cycle has started, it is determined by means of an electronic control and/or CPU the load size and the types of restrictions on the dryer. Once this has been determined and all the above facts are gathered (cycle type, level of dryness, load weight and restrictions), a function of the same is established based on the same, and based on the type of dryer, according to a table with pre-determined values, both the value of the "target voltage" as well as the value of the "Minimum Cycle Time", as well as other values such as the "Multiplier" and the "Aggregate". Once the target voltage value is established, this is compared to a filtered voltage, and in case that said filtered voltage is larger, a time is set to achieve the target voltage. Furthermore, and having all the values previously mentioned an "Additional time" is calculated by means of an equation and as a function to the "Heat factor" value, which is also established by means of a table of pre-determined values. Finally said Additional Time is added to the Time lapsed to obtain an Objective Time or cycle total.

Thus, it is an aspect of the present invention to provide a method which gives a clothes dryer the flexibility to adjust the cycle times as a function of the "heat factor". Also, it is an aspect of this invention to provide a dryer which can carry out such a method.

It is another aspect of the present invention to provide a method to attain dry clothes at the end of a cycle with all the possible heat levels, to ensure, in the best way possible, the dryness of the textiles being dried. Also, it is an aspect of the present invention to provide a dryer which is capable of carrying out such a method.

BRIEF DESCRIPTION OF THE FIGURES

This and other aspect shall become evident when the following description is taken into account in conjunction with the figures described below.

DETAILED DESCRIPTION OF THE INVENTION

Figure 1:
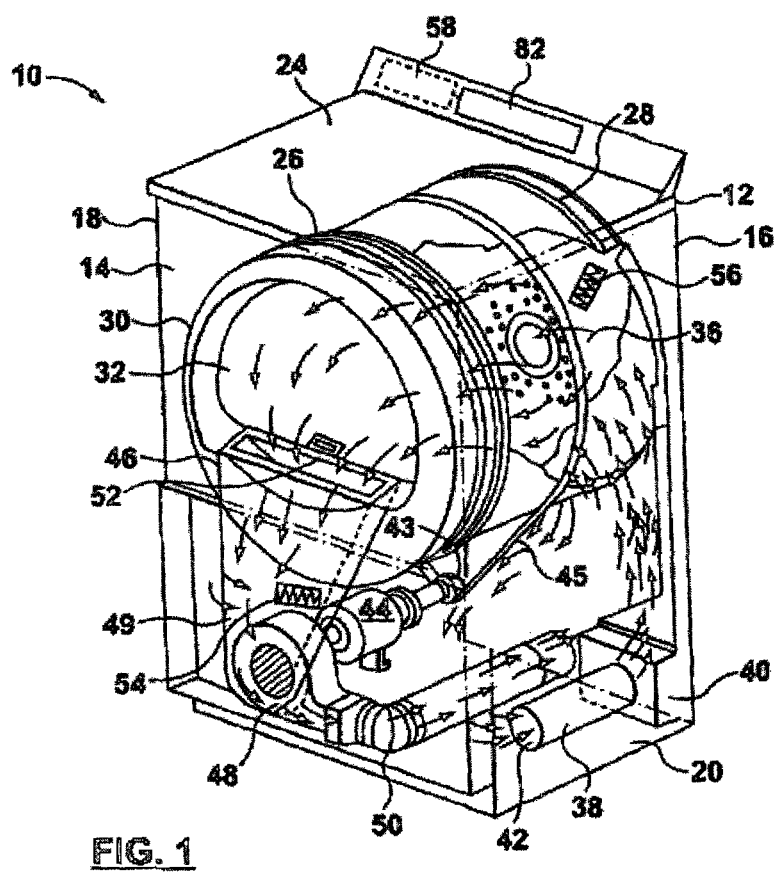
FIG. 1 shows a conventional view of a dryer.

The present invention is directed to a drying method, specifically to a drying method in a household clothes dryer which allows the dryer the flexibility of adjusting cycle times, preferably drying times as a function of the heat levels selected.

Definitions

The use of the term "approximately" provides an additional range of determined time. The term is defined in the following way. The additional range of time provided by the term is that of approximately ±10%. As an example, but not in limitative manner, if it states "approximately between 30 to 40 seconds", the exact range is between 27 and 44 seconds, or can be between 33 and 44 seconds, or can be between 27 and 36 seconds or between 33 and 36 seconds. Any of the possibilities previously described is covered by the term "approximately".

The term "Aggregate" refers to a time value predetermined in a table, where the aggregate is a function of the type of dryer (gas or electric), the type of cycle, the level of dryness, the load and the restrictions.

The term "Bone Dry" is a term used in the area to refer to the textile dry weight.

The term "Squared Raw Voltage" refers to a total sum of the squares obtained by the crude voltage in a graph of descriptive statistics.

The term "State of charge" refers to a value which determines the state of the load of the textiles which are found within the drum.

The term "Heat factor" refers to a factor as a function of the heat level selected by the operator and the type of cycle.

The term "FMC" refers to the percentage of water remaining in the textiles, that is to say, to the final moisture content.

The term "Samples" refers to the total sum of examples of crude square voltages available.

The term "Multiplier" refers to a pre-determined value in a table, related to the expression of final drying time, where the multiplier is a function of the type of dryer (gas or electric), the type of cycle, the load and the restrictions.

The term "Heat level" is a parameter selected by the operator.

The term "Restriction" refers to the possible restrictions found at the exit of the moist air which emanate from the inner drum towards the exterior. Among possible restrictions are the diameter size of the exit duct, the length of the exit duct, the height of the exit duct, obstructions etc.

The term "Additional time" or "extra time" is the time which extends the drying cycle from the minimum time to dry the load inside the dryer's drum.

The term "Minimum Drying time" or "Minimum time" is the minimum time calculated based on tests and pre-established in which the dryer must be on in order to achieve the objective level of dryness, which is a function of the type of cycle, level of cycle, load weight and the restrictions.

The term "Trtv" or time to reach target value is the time lapsed in the drying cycle to attain the objective pre-established voltage.

The term "Type of cycle" is a parameter selected by the operator.

The term "Crude voltage" refers to the voltage without any type of signal conditioning or digital signal processing, but rather just the simple voltage acquisition which it is measuring.

The term "Filtered Voltage" refers to a voltage with signal conditioning and/or digital signal processing.

The term "Target voltage" is the voltage measured by the moisture detectors, which shall be explained at great length in the following detailed description of the invention.

The usual layout of a dryer shall be described. This layout can change and is not subject to being as mentioned below, but the different layouts of dryers must be taken into account from previous art.

FIG. 1 shows a conventional view of a textile dryer 10 which can benefit from the present invention. The dryer can include a cabinet or main casing 12, a front panel 14, a back panel 16, a pair of side panels 18, 20 spaced between them by the front and back panels and an upper cover 24. Within the main casing 12 is a drum or container 26 mounted for rotation around a substantially horizontal axis. A motor 44 rotates the drum on the horizontal axis by means of, for example, a pulley 43 and a band 45. The drum generally has a cylindrical shape; it has an outer perforated cylindrical wall 28 and is closed on its front by a wall 30 which defines an opening 32 in the drum 26. Clothing articles and other textiles are introduced into the drum 26 through the opening 32. A plurality of dumping ribs (not shown) is found within the drum to raise the articles and later allow them to be dumped again to the drum's lower part while the drum rotates. The drum 26 includes a back wall 34 which is supported in a rotating manner within the main casing 12 by an adequately fixed bearing. The back wall 34 includes a plurality of holes 36 which receive hot air which has been treated by a heating means, such as a combustion chamber 38 and a back duct 40. The combustion chamber 38 receives air at room temperature via an entrance 42. Even though the sample dryer 10 shown in FIG. 1 is a gas one, the option of an electric dryer should also be considered which has heating resistance elements located in the heating chamber placed next to the outer perforated cylindrical wall 28 which would replace the combustion chamber 38 and the back duct 40 of a gas dryer. The heated air is suctioned from the drum 26 by a fan 48, same which is driven by the motor 44. The air passes through a filter screen 46 which traps any type of felt particles. While the air passes through the filter screen 46, a seal duct tramp 48 enters and it is passed outside the clothes dryer through an exit duct 50. After the articles have been dried, they are removed from the drum 26 via the opening 32.

In an exemplary embodiment of this invention, a moisture detector 52 is used to predict the percentage of moisture content or dryness level of the articles in the container. The moisture detector 52 typically comprises a pair of spaced bars or electrodes and also comprises circuits to provide a representation of the voltage signal of the moisture content of the articles to an electric control 58 based on the electric resistance or ohms of the articles. The moisture detector 52 is located on the inner lower front wall of the drum and alternatively they have been mounted on the back part of drum's wall when this wall is in resting phase. In some instances, the moisture detector has been used in a baffle contained in the dryer's drum. As an example, and not as a limitation, the signal from the detector can be chosen to provide a continual representation of the moisture content of the articles within an adequate range to be processed by the electric control 58.

The textiles being dumped within the dryer's drum 26, randomly contact the spaced electrodes of the stationary moisture detector 52, so that the textiles are intermittently in contact with the detector's electrodes. The length of time of contact between the textiles and the detector's electrodes depends on various factors, such as the rotational velocity of the drum, the type of textile, the quantity or volume of clothes in the drum and the air flow through the drum. When the wet textiles are in the dryer's drum and in contact with the detector's electrodes, the resistance through the detector is low. When the textiles are dry and contact the detector's electrodes, the resistance through the detector is high and indicative of a dry load. However, situations can exist which can result in erroneous indications of the actual dryness level of the articles. For example, in a situation when the wet textiles are not in contact with the detectors, like for example in the case of a small load, the resistance through the detector is very high (open circuit), which would be falsely indicative of a dry load. Additionally if a conductive portion of dry textiles, like for example a button or a metal zipper contacts the detector's electrodes, the resistance of the detector would be low, which would be falsely indicative of a wet load. Thus, when the textiles are wet there can be times when the detector can erroneously detect a dry condition (high resistance) and, when the textiles are dry, there can be times when the detector erroneously detects a wet condition (low resistance).

The reduction and smoothing of noise is provided by an electric controller 58 which has a more accurate and trusted detection method of the actual dryness of the articles and results in a more certain and trusted control of the dryness operation. However, the noise reduction per se does not completely compensate for the size variations of the load or the different dryers which have differing air flow restrictions in light of differing fan systems.

The electric control 58 responds to a voltage signal of the moisture detector 52 and predicts a percentage of moisture content or degree of dryness of the articles in the container as a function of the resistance of the articles. As is previously suggested, the value of the voltage signal administered by the moisture detector 52 is related to the moisture content of the textiles. For example, at the beginning of the cycle, when the textiles are wet, the voltage of the moisture detector can be in the range of one or two volts. For example, while the textiles are being dried, the voltage of the moisture detector 52 can increase to a maximum of approximately five volts.

The electric control 58 is also coupled with an entering temperature detector 56, such as, for example, a thermostat. The entering temperature detector 56 is mounted to the dryer 10 on the air flow entering the drum 26. The entering temperature detector 56 detects the temperature which enters the drum 26 and sends a corresponding temperature signal 58 to the electric control. The electric control is also coupled to the exiting temperature detector 54 which detects the air temperature exiting the drum 26 and sends a corresponding temperature signal to the electric control 58. The electric control 58 interprets these signals to generate an air flow parameter based on the entering temperature increase and/or a size of load parameter based on the exiting temperature increase. These parameters, among others, are used to select an objective moisture signal, which in turn is used by the controller 58 in conjunction with the filtered and/or reduced noise voltage signal of the moisture conductor 52 to control the dryer's 10 operation, in order to obtain an target voltage signal.

Figure 2:
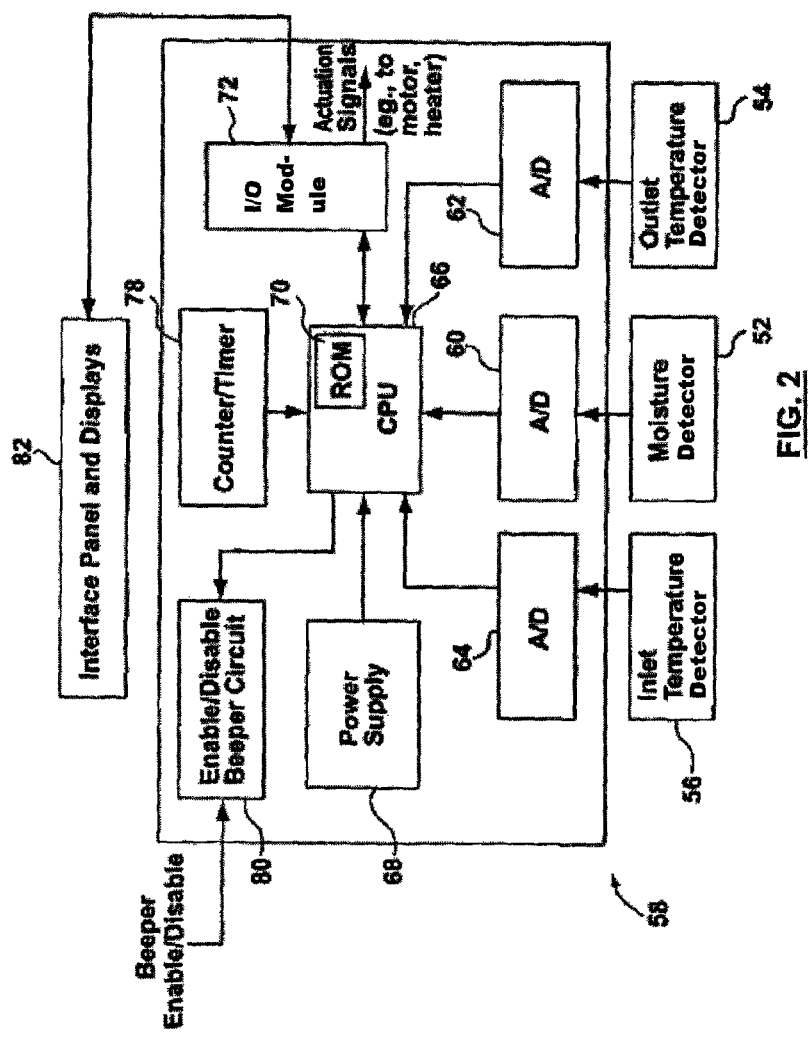
FIG. 2 shows a block diagram of a control system which can be adopted by the present invention.

A more detailed illustration of the electric control 58 is shown in FIG. 2. The electric control 58 comprises an analog to digital converter (A/D) 60 to receive the signal representations sent by the moisture detector 52. The signal representation of the A/D converter 60 and a counter/timer 78 is sent to a central processing unit (CPU) 66 for greater processing of the signal which shall be described below in greater detail. The CPU 66 also receives the entering and exiting temperature signals respectively of the temperature detectors 56 and 54 respectively, via two distinct analog to digital converters (A/D) 62 and 64. The CPU 66 receives energy from a power supply 68, comprises one or more processing modules stored in an adequate memory device, such as a reading memory solely ROM 70, to predict a moisture percentage content or degree of dryness of the textile articles in the container as a function of the electric resistance of the articles, as well as to process elapsed time and add an additional time. It is appreciated that the memory device is not necessarily limited to ROM memory; any type of memory device can be used, such as for example, an erasable programmable reading memory (EPROM) which stores instructions and data would also work effectively. Once it has been determined that the textile articles have reached a desired dryness level, then the CPU sends respective signals to an input/output module 72 which in turn sends respective signals to de-energize the motor and/or the heating means. While the drying cycle shuts down, the control can activate a whistle via an enabling/disabling whistle circuit to indicate the end of the cycle to the operator. An electronic interface and display panel 82 allow the user to program the dryer's operation and additionally allows for monitoring the respective cycle progression of the dryer's operation.

Figure 3:
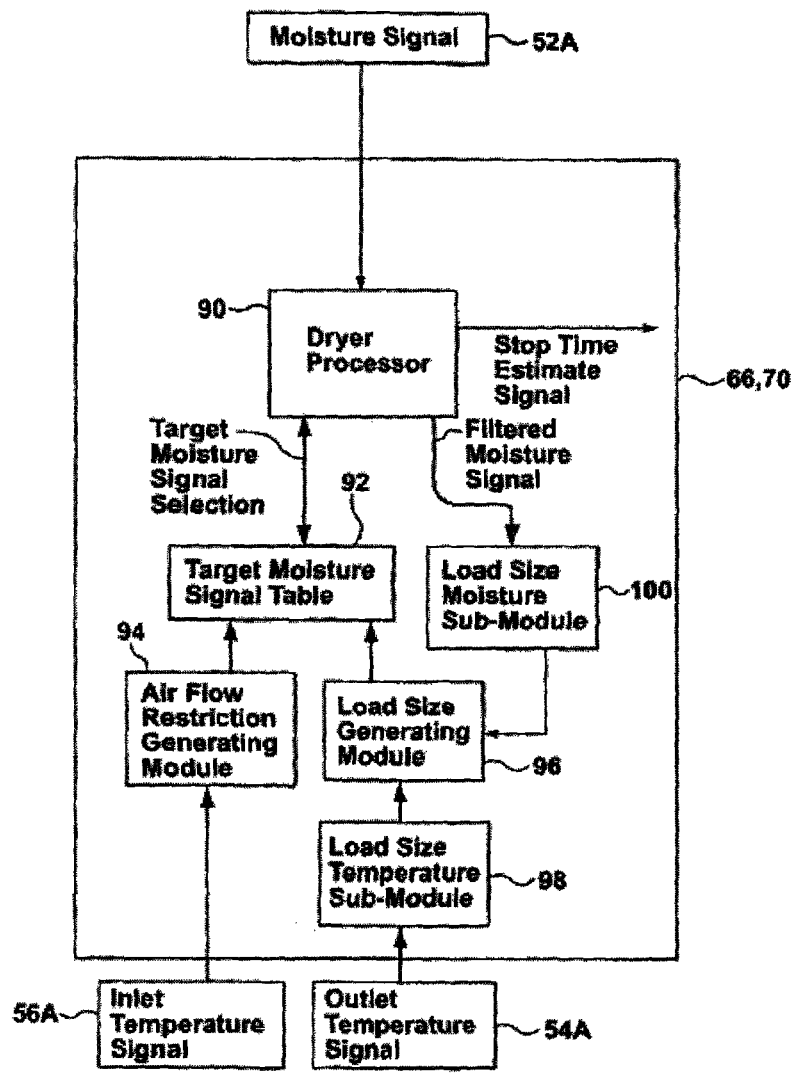
FIG. 3 shows a block diagram of the processor and the modules which generate parameters of the present invention.

The CPU 66 and the ROM 70 can be configured as is shown in FIG. 3 to comprise a dryer processor 90. The processor 90 estimates the stop time or end of cycle time and controls the dryer 10 operation based on a moisture signal 52A received from the moisture detector 52, in the time lapsed and in the additional time. The processor 90 filters the moisture signal or voltage signal and compares this to the objective moisture signal to control the operation of dryer 10. There exist many common methods and systems to filter the moisture signal. For more detailed information on the filtering of this signal, one can refer to Canadian Patent Application number 2,345,631 published on Nov. 2, 2001 or also US publication 2006/0272177 which corresponds to patent application Ser. No. 11/430,979. According to the present invention, the processor 90 selects a target voltage signal—or objective moisture—from a table 92 of target moisture signals or voltages.

Figure 4:
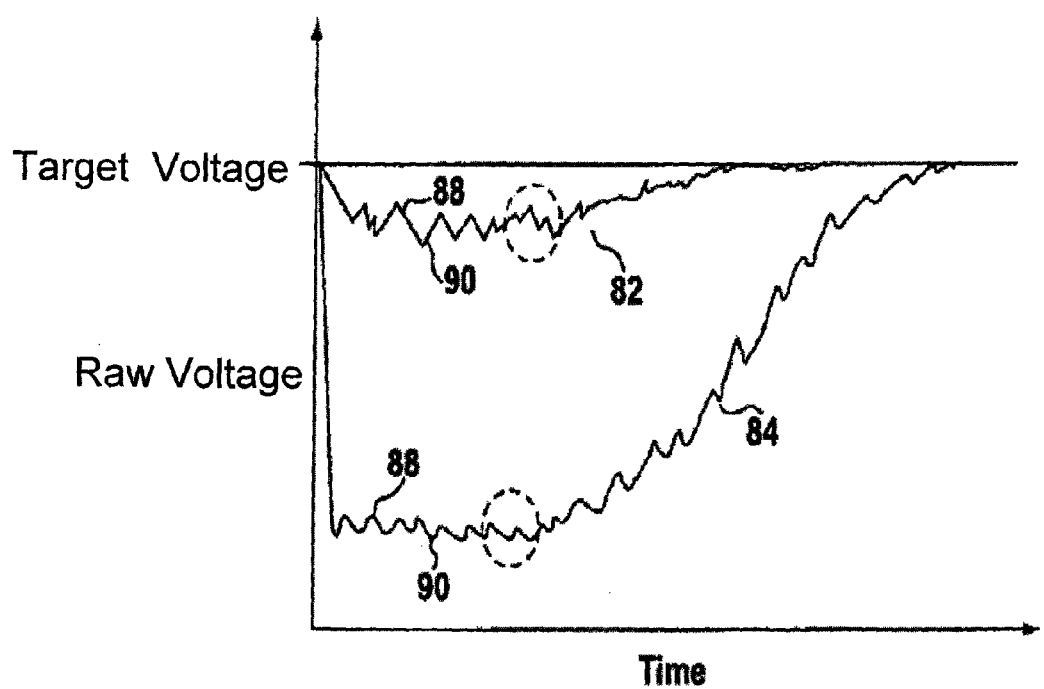
FIG. 4 shows a representative diagram of the voltages obtained by the moisture detector.
Figure 5:
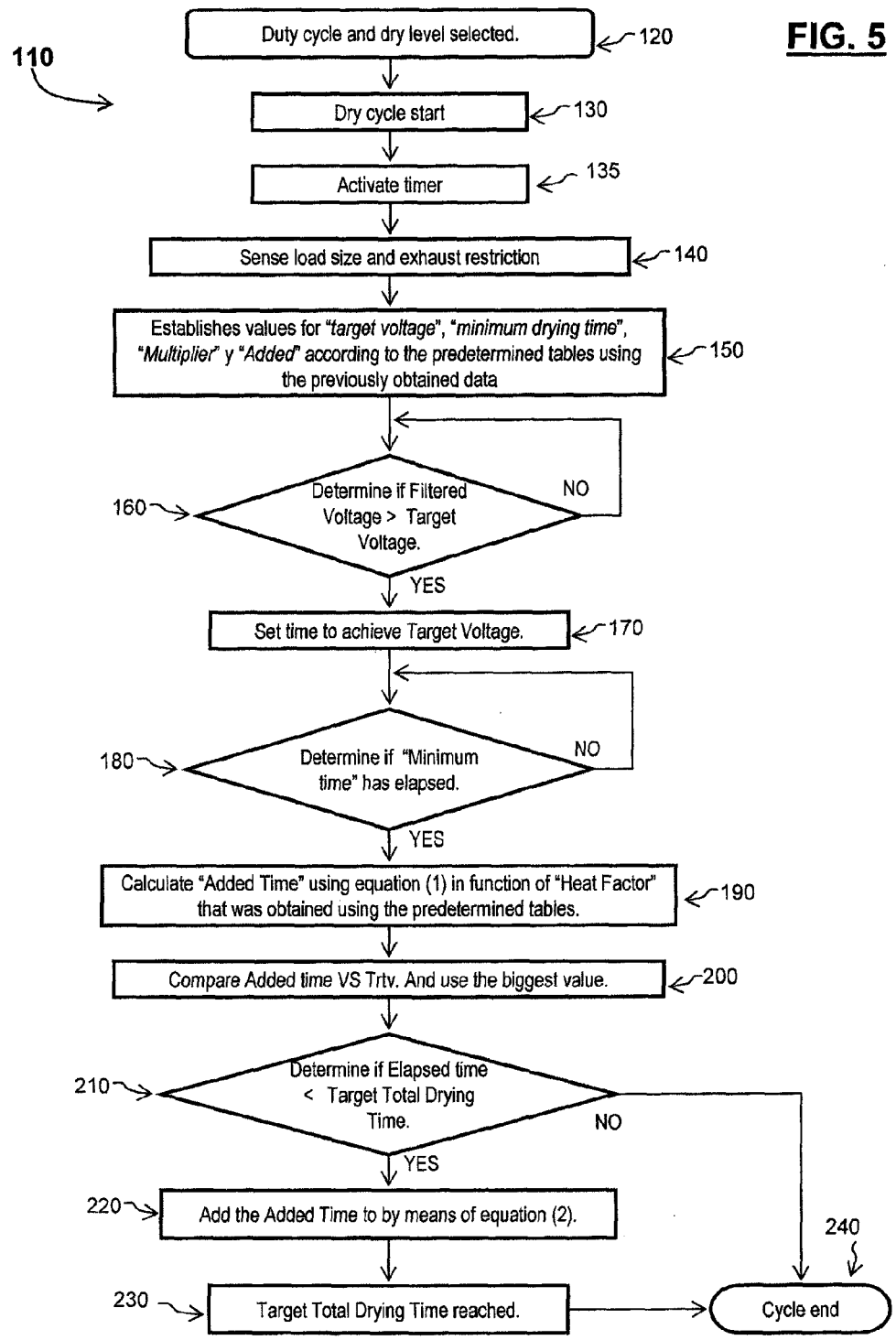
FIG. 5 shows a flow diagram of a method for drying time compensation according to the present invention.
Figure 6:
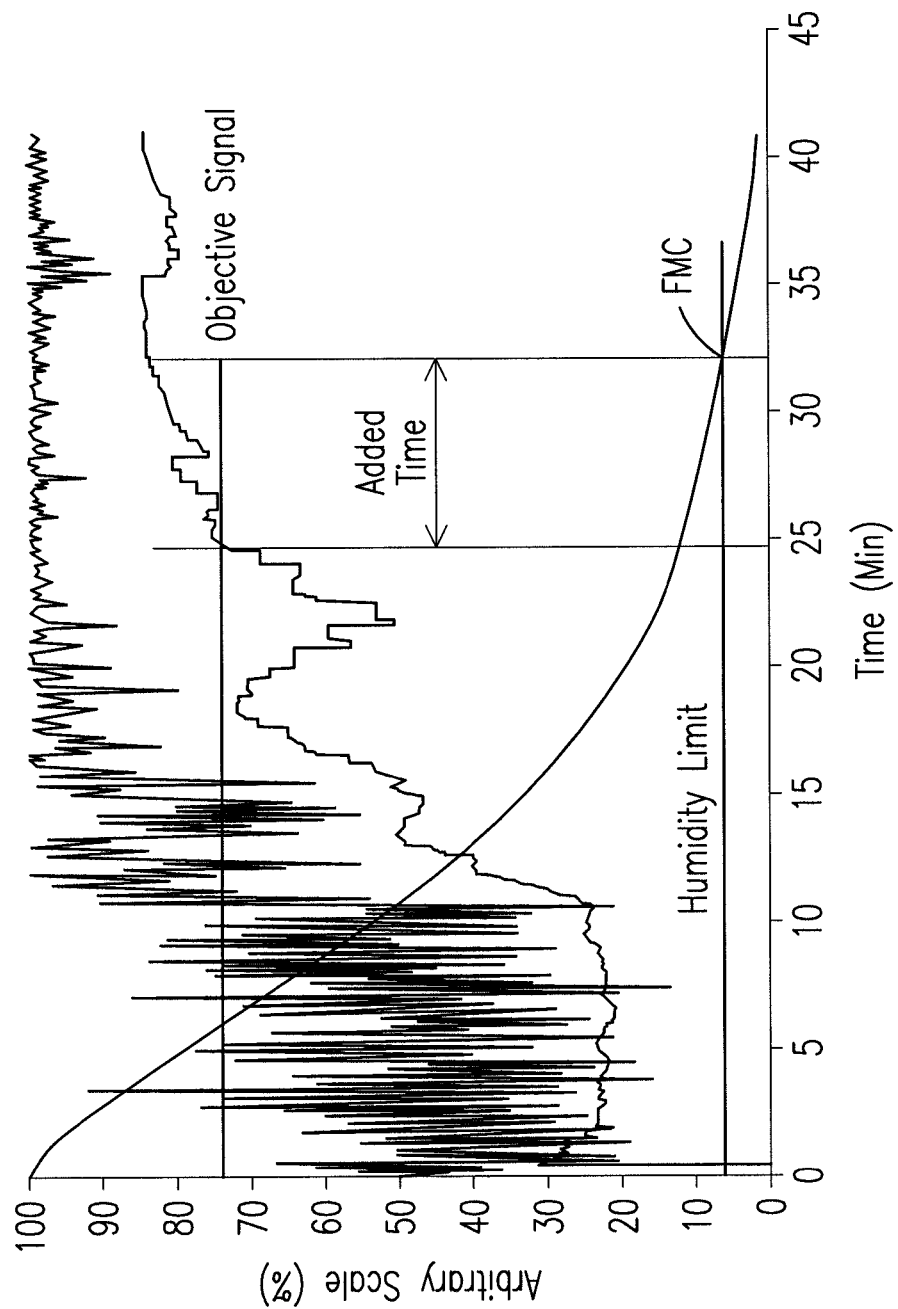
FIG. 6 is a graph of the relationship between the signal of the moisture detector and the remaining water level present in the clothes and the cycle time.

In reference to FIG. 4, it shows two curves 82 and 84 which are indicative of the crude voltage signal detected by the moisture detectors 52 during the drying cycle, according to an embodiment of the present invention where the crude voltage signal provided by the detector 52 and the associated circuitry has a lesser value for wet textiles and a higher value for dry textiles. The curve 82 represents a curve which is indicative of a heavy load. The curve 84 is closer to the true moisture of the textiles in the dryer than curve 82 in light of a larger number of textiles being in contact with the bars or electrodes of the detector during the drying process. When the textiles touch the detector's electrodes 52 and the voltage decreases through the detector's electrodes thus decreasing to a lesser value which is indicative of the moisture content of the textiles. However, if the textiles do not contact the detector's electrodes for a prolonged period of time to over-come the responding time proposed associated with the detector's electrodes, then the signal reading does not reach its stable value state.

From FIG. 4 it can be seen that curves 82, 84 have a series of maximums 88 and minimums 90. For small loads, it is noted that the minimums 90 are farther away from the real moisture level of the load in comparison to the larger loads on the curve 84. However, the curve inclination immediately preceding the minimum 90 for small loads is usually more inclined than the heavier loads. The present invention in the embodiment of FIG. 4 provides the electric control 58 and/or the processor 90 to detect the voltage signal minimums 90 of the electrode detector and the gradient immediately preceding the minimum. The processor and/or electric control 58 use this information to extrapolate the pre-set moisture signals for each minimum and/or maximum. When it is obtained that the voltage signal sent is equal to, or during a determined time an average equal to that of the target voltage, this information is extrapolated to add an extra set amount of time.

The effectiveness of the humidity detector 52 in determining the moisture content of the load being dried is an important factor in detecting dryness.

With the end goal of not having damp parts of the load at the end of the drying cycle, the dryer 10 extrapolates the drying time after the voltage signal obtained from the moisture detector 52 has been equaled to the target voltage, same which represents the level where the moisture detector loses sensitivity.

The risk in energy saving drying cycles is that the load not be sufficiently dry because the minimum time or the time to reach target value, Trtv, is not adequate and in the same manner that the additional time take more time and consequently more energy than that which is necessary to dry. The risk in high energy drying cycles is that the load be over-dried because the additional time is inappropriate thus shrinking the load.

Thus, the processor 90 calculates and compensates times in a precise manner to predict the minimum drying time and the additional time. The problem, therefore, is to provide the dryer 10 the flexibility to adjust the cycle time by means of the target voltage calculations and the minimum amount of time as a function of the factors previously mentioned, such as the type of dryer, the dryness level, the restrictions, the type of cycle, and the load weight, among other factors; as well as adjusting the cycle time by means of calculations of additional time as a function of the factors previously mentioned, such as the heat factor, the type of dryer, the minimum time or the time to reach target value, the Trtv, the multiplier and the aggregate. The purpose of the problem to be solved is to have dry clothes at the end of the cycle, despite the predetermined heat level or that selected by the operator, allowing for the use of the lowest level of energy consumption possible and the overall satisfaction of a proper dryness of the load within the dryer 10.

Thus, the drying cycle of the present invention enables to more precisely determine the additional time required of the differing cycles as a function of the heat factor to arrive at the correct and uniform dryness of the load.

In this way, in the time compensation method for a clothes dryer of the present invention 110, the drying cycle is begun 130 once the operator has selected 120 from the dryer's control panel 82 a type of cycle and a desired dryness level for the clothes to be dried. Once the cycle has started, a timer is activated 135 and it is determined 140 by means of an electronic control 58 and/or CPU 66 the load size and the types of restrictions on the dryer. Once this has been determined and all the above facts are gathered (cycle type, level of dryness, load weight and restrictions), a function of the same is established 150 based on the same, and based on the type of dryer, both the "Voltage Objective" as well as the "Minimum Time of Cycle" according to the following table of pre-determined values:

TABLE (1)

| DOD Profile | Desired Dryness Level | Restriction | Weight | Target Voltage | Final Drying Time Expression M | A | Minimum Drying Time | A | Minimum Drying Time |
|---|---|---|---|---|---|---|---|---|---|
| DOD Cotton Electric or gas | Damp | Small | Small | 3.10-3.35 | 0.50-1.50 | 0-3 | 10-14 | 0 | 12 |
| | | | Large | 2.15-2.45 | 0.50-1.50 | 0-3 | 23-27 | 0 | 25 |
| | | Large | Small | 3.25-3.55 | 0.50-1.50 | 0-3 | 9-13 | 0 | 11 |
| | | | Large | 2.15-2.45 | 0.50-1.50 | 0-3 | 12-16 | 0 | 14 |
| | Less Dry | Small | Small | 3.20-3.50 | 0.50-1.50 | 0-3 | 18-22 | 0 | 20 |
| | | | Large | 3.10-3.35 | 0.50-1.50 | 0-3 | 28-32 | 1 | 30 |
| | | Large | Small | 3.35-3.60 | 0.50-1.50 | 0-3 | 15-19 | 0 | 17 |
| | | | Large | 3.15-3.45 | 0.50-1.50 | 0-3 | 24-28 | 1 | 26 |
| | Dry | Small | Small | 2.60-2.90 | 0.50-1.500 | 17-23 | 32-36 | 19 | 34 |
| | | | Large | 2.90-3.20 | 0.50-1.50 | 15-20 | 32-36 | 17 | 34 |

TABLE (1)-continued

| DOD Profile | Desired Dryness Level | Restriction | Weight | Target Voltage | Final Drying Time Expression M | A | Minimum Drying Time | A | Minimum Drying Time |
|---|---|---|---|---|---|---|---|---|---|
| | | Large | Small | 3.25-3.55 | 0.50-1.50 | 12-17 | 25-29 | 15 | 27 |
| | | | Large | 3.25-3.55 | 0.50-1.50 | 10-15 | 31-35 | 12 | 33 |
| | More Dry | Small | Small | 3.35-3.60 | 0.50-1.50 | 20-25 | 30-34 | 23 | 32 |
| | | | Large | 3.40-3.70 | 0.50-1.50 | 20-25 | 37-41 | 21 | 39 |
| | | Large | Small | 3.15-3.45 | 0.50-1.50 | 20-25 | 32-36 | 22 | 34 |
| | | | Large | 3.15-3.45 | 0.50-1.50 | 17-23 | 34-38 | 20 | 36 |
| DOD Mix Loads Electric or gas | Damp | Small | Small | 3.15-3.45 | 0.50-1.50 | 0-3 | 11-15 | 0 | 13 |
| | | | Large | 2.30-2.60 | 0.50-1.50 | 0-3 | 18-22 | 0 | 20 |
| | | Large | Small | 3.20-3.50 | 0.50-1.50 | 0-3 | 8-12 | 1 | 10 |
| | | | Large | 1.90-2.15 | 0.50-1.50 | 0-3 | 17-21 | 1 | 19 |
| | Less Dry | Small | Small | 3.50-3.80 | 0.50-1.50 | 0-3 | 13-17 | 2 | 15 |
| | | | Large | 3.45-3.75 | 0.50-1.50 | 0-3 | 28-32 | 0 | 30 |
| | | Large | Small | 3.50-3.80 | 0.50-1.50 | 0-5 | 11-15 | 3 | 13 |
| | | | Large | 3.50-3.80 | 0.50-1.50 | 0-3 | 18-22 | 0 | 20 |
| | Dry | Small | Small | 3.45-3.75 | 0.50-1.50 | 12-18 | 22-26 | 15 | 24 |
| | | | Large | 3.45-3.75 | 0.50-1.50 | 10-15 | 19-23 | 13 | 21 |
| | | Large | Small | 3.25-3.55 | 0.50-1.50 | 12-18 | 26-30 | 15 | 28 |
| | | | Large | 3.25-3.55 | 0.50-1.50 | 10-15 | 27-31 | 12 | 29 |
| | More Dry | Small | Small | 3.50-3.80 | 0.50-1.50 | 20-25 | 16-20 | 21 | 18 |
| | | | Large | 3.45-3.75 | 0.50-1.50 | 27-22 | 16-20 | 20 | 18 |
| | | Large | Small | 3.20-3.50 | 0.50-1.50 | 20-25 | 22-26 | 22 | 24 |
| | | | Large | 3.45-3.75 | 0.50-1.50 | 15-20 | 26-30 | 18 | 28 |
| DOD Easy Care Electric or gas | Damp | Small | Small | 2.90-3.20 | 0.50-1.50 | 0-3 | 11-15 | 0 | 13 |
| | | | Large | 1.30-1.60 | 0.50-1.50 | 0-3 | 18-22 | 0 | 20 |
| | | Large | Small | 2.30-2.60 | 0.50-1.50 | 0-3 | 12-16 | 0 | 14 |
| | | | Large | 1.15-1.40 | 0.50-1.50 | 0-3 | 13-17 | 0 | 15 |
| | Less Dry | Small | Small | 3.40-3.65 | 0.50-1.50 | 0-5 | 13-17 | 4 | 15 |
| | | | Large | 3.40-3.65 | 0.50-1.50 | 0-3 | 24-28 | 0 | 26 |
| | | Large | Small | 3.30-3.60 | 0.50-1.50 | 0-3 | 14-18 | 2 | 16 |
| | | | Large | 2.30-2.60 | 0.50-1.50 | 0-3 | 17-21 | 0 | 19 |
| | Dry | Small | Small | 3.50-3.75 | 0.50-1.50 | 10-16 | 22-26 | 14 | 24 |
| | | | Large | 3.55-3.80 | 0.50-1.50 | 10-15 | 15-19 | 12 | 17 |
| | | Large | Small | 3.15-3.40 | 0.50-1.50 | 12-18 | 25-29 | 15 | 27 |
| | | | Large | 3.10-3.35 | 0.50-1.50 | 5-10 | 21-25 | 6 | 23 |
| | More Dry | Small | Small | 3.40-3.70 | 0.50-1.50 | 20-25 | 17-21 | 22 | 19 |
| | | | Large | 3.30-3.55 | 0.50-1.50 | 17-22 | 17-21 | 20 | 19 |
| | | Large | Small | 3.10-3.35 | 0.50-1.50 | 20-25 | 28-32 | 22 | 30 |
| | | | Large | 3.40-3.70 | 0.50-1.50 | 5-10 | 16-20 | 7 | 18 |
| DOD Active Wear Electric or gas | Damp | Small | Small | 2.60-2.85 | 0.50-1.50 | 0-3 | 26-30 | 1 | 28 |
| | | | Large | 2.25-2.55 | 0.50-1.50 | 0-5 | 28-32 | 3 | 30 |
| | | Large | Small | 2.80-3.10 | 0.50-1.50 | 2-7 | 27-31 | 5 | 29 |
| | | | Large | 2.35-2.65 | 0.50-1.50 | 0-3 | 25-29 | 0 | 27 |
| | Less Dry | Small | Small | 1.85-2.15 | 0.50-1.50 | 26-31 | 22-26 | 29 | 24 |
| | | | Large | 3.35-3.60 | 0.50-1.50 | 0-3 | 28-32 | 0 | 30 |
| | | Large | Small | 2.70-3.00 | 0.50-1.50 | 12-17 | 24-28 | 14 | 26 |
| | | | Large | 2.95-3.20 | 0.50-1.50 | 0-3 | 28-32 | 0 | 30 |
| | Dry | Small | Small | 2.30-2.60 | 0.50-1.50 | 30-35 | 18-22 | 32 | 20 |
| | | | Large | 0.95-1.20 | 0.50-1.50 | 45-50 | 18-22 | 48 | 20 |
| | | Large | Small | 2.85-3.15 | 0.50-1.50 | 20-25 | 28-32 | 24 | 30 |
| | | | Large | 2.90-3.20 | 0.50-1.50 | 16-21 | 36-40 | 19 | 38 |
| | More Dry | Small | Small | 3.20-3.50 | 0.50-1.50 | 20-26 | 18-22 | 25 | 20 |
| | | | Large | 0.95-1.20 | 0.50-1.50 | 50-56 | 18-22 | 53 | 20 |
| | | Large | Small | 2.85-3.15 | 0.50-1.50 | 26-32 | 18-22 | 29 | 20 |
| | | | Large | 3.55-3.85 | 0.50-1.50 | 20-25 | 15-19 | 21 | 17 |
| DOD Delicates Electric or gas | Damp | Small | Small | 2.60-2.90 | 0.50-1.50 | 0-3 | 3-7 | 1 | 5 |
| | | | Large | 2.60-2.90 | 0.50-1.50 | 0-3 | 3-7 | 1 | 5 |
| | | Large | Small | 0.95-1.20 | 0.50-1.50 | 0-5 | 6-10 | 4 | 8 |
| | | | Large | 2.35-2.60 | 0.50-1.50 | 0-3 | 3-7 | 1 | 5 |
| | Less Dry | Small | Small | 2.40-2.70 | 0.50-1.50 | 0-3 | 13-17 | 1 | 15 |
| | | | Large | 2.95-3.20 | 0.50-1.50 | 0-3 | 3-7 | 0 | 5 |
| | | Large | Small | 2.05-2.30 | 0.50-1.50 | 0-3 | 11-15 | 1 | 13 |
| | | | Large | 2.85-3.15 | 0.50-1.50 | 0-3 | 7-11 | 1 | 9 |
| | Dry | Small | Small | 2.60-2.90 | 0.50-1.50 | 3-7 | 15-19 | 5 | 17 |
| | | | Large | 3.55-3.80 | 0.50-1.50 | 0-5 | 24-28 | 3 | 26 |
| | | Large | Small | 3.55-3.80 | 0.50-1.50 | 0-3 | 9-13 | 2 | 11 |
| | | | Large | 3.40-3.70 | 0.50-1.50 | 0-5 | 12-16 | 3 | 14 |
| | More Dry | Small | Small | 3.55-3.85 | 0.50-1.50 | 3-7 | 8-12 | 5 | 10 |
| | | | Large | 3.55-3.85 | 0.50-1.50 | 5-10 | 10-14 | 8 | 12 |
| | | Large | Small | 3.40-3.70 | 0.50-1.50 | 0-5 | 13-17 | 4 | 15 |
| | | | Large | 3.40-3.70 | 0.50-1.50 | 0-5 | 9-13 | 4 | 11 |
| DOD FastSpeed Dry Electric | Damp | Small | Small | 3.05-3.30 | 0.50-1.50 | 0-3 | 11-15 | 0 | 13 |
| | | | Large | 2.30-2.60 | 0.50-1.50 | 0-3 | 22-26 | 0 | 24 |
| | | Large | Small | 3.10-3.35 | 0.50-1.50 | 0-3 | 11-15 | 0 | 13 |
| | | | Large | 2.15-2.45 | 0.50-1.50 | 0-3 | 14-18 | 0 | 16 |

TABLE (1)-continued

| DOD Profile | Desired Dryness Level | Restriction | Weight | Target Voltage | Final Drying Time Expression M | A | Minimum Drying Time | A | Minimum Drying Time |
|---|---|---|---|---|---|---|---|---|---|
| or gas | Less Dry | Small | Small | 3.25-3.55 | 0.50-1.50 | 0-5 | 19-23 | 3 | 21 |
| | | | Large | 3.05-3.30 | 0.50-1.50 | 0-3 | 28-32 | 1 | 30 |
| | | Large | Small | 3.25-3.55 | 0.50-1.50 | 3-7 | 17-21 | 5 | 19 |
| | | | Large | 3.05-3.30 | 0.50-1.50 | 0-3 | 26-30 | 1 | 28 |
| | Dry | Small | Small | 3.25-3.55 | 0.50-1.50 | 15-21 | 22-26 | 19 | 24 |
| | | | Large | 3.45-3.70 | 0.50-1.50 | 11-17 | 14-18 | 15 | 16 |
| | | Large | Small | 3.20-3.50 | 0.50-1.50 | 15-21 | 12-16 | 19 | 14 |
| | | | Large | 3.10-3.35 | 0.50-1.50 | 11-17 | 22-26 | 15 | 24 |
| | More Dry | Small | Small | 3.25-3.55 | 0.50-1.50 | 25-31 | 12-16 | 29 | 14 |
| | | | Large | 3.35-3.65 | 0.50-1.50 | 20-25 | 16-20 | 24 | 18 |
| | | Large | Small | 3.40-3.70 | 0.50-1.50 | 22-27 | 24-28 | 25 | 26 |
| | | | Large | 3.20-3.50 | 0.50-1.50 | 19-24 | 20-24 | 22 | 22 |

The values in Table (1) are approximate and are not restricted to be the determinate values: in the same way value ranges are assigned because these vary according to the characteristics of each different type of dryer. Only certain types of cycles are shown as examples, however, it should be noted, that this table applies for all types of cycles and for both electric and gas dryers. Ranges are provided in target voltage times and minimum times; however, a target voltage and a minimum time are established for each expression found in the table.

Once the target voltage time has been established, it is compared 160 against the filtered voltage and in case the filtered voltage is a higher value (V filtered>V objective), a time 170 is set in order to attain the target voltage.

Additionally, from the same row on the table and as a function of the same data, the values "M" and "A", "multiplier" and "aggregate" are obtained respectively, which are the values previously calculated by the inventors and by the holder of the present invention and they are later used for the posterior calculation for "additional time" as is later explained.

Thus, in a manner exclusively used as an example and with the purpose of explaining in a more detailed form the use of the previously mentioned Table (1), it is such that: supposing that a drying cycle takes place according to the present invention in an electric dryer, where the cycle type selected is a "Mixed Load", it is also required that the "Less Dry" cycle level be selected, it is also determined that the restriction be "Small load" and that the load indeed be "small", consequently, according to Table (1) shown above and as a function of said data previously determined, it is established that the "Target Voltage" has a value between 3.50-3.80 volts and that the "Minimum Time" has a value between 13 to 17 minutes of operation.

Thus, continuing with the drying method and once the "Target Voltage", "Minimum Time", "Multiplier" and "Aggregate" values have been established, it is determined 180 whether said "Minimum Time" has lapsed, and once lapsed, the "Additional Time" 190 is calculated according to the following equation (1):

$$T_{additional} = \max\{(\text{Heat Factor}) \times [\text{Trtv (Multiplier}-1) + \text{Agreggate}]; T\text{minimum} - \text{Trtv}\}$$

From the following Table (2) the Heat Factor parameter can be obtained:

| | Eco Dry | Extra Low | Low | Medium | High | Sanitize |
|---|---|---|---|---|---|---|
| Cotton Electric | 1.50-1.63 | 2.47-2.52 | 1.23-1.28 | 1.23-1.28 | 0.82-0.87 | 0.82-0.87 |
| Mix Loads Electric | 1.50-1.63 | 2.47-2.52 | 1.22-1.27 | 1.22-1.27 | 0.75-0.80 | 0.75-0.80 |
| Easy Care Electric | 1.75-1.80 | 2.47-2.52 | 1.23-1.28 | 0.97-1.02 | 0.97-1.02 | 0.97-1.02 |
| Active Wear Electric | 1.39-1.44 | 2.47-2.52 | 1.38-1.43 | 1.15-1.20 | 1.15-1.20 | 1.15-1.20 |
| Delicate Electric | 2.47-2.52 | 2.07-2.12 | 0.94-0.99 | 0.94-0.99 | 0.94-0.99 | 0.94-0.99 |
| Speed Dry Electric | 1.31-1.36 | 2.47-2.52 | 0.84-0.89 | 0.84-0.89 | 0.35-0.40 | 0.35-0.40 |
| Cotton Gas | 1.58-1.63 | 2.47-2.52 | 1.23-1.28 | 1.23-1.28 | 0.82-0.87 | 0.82-0.87 |
| Mix Loads Gas | 1.58-1.63 | 2.47-2.52 | 1.22-1.27 | 1.22-1.27 | 0.75-0.80 | 0.75-0.80 |
| Easy Care Gas | 1.75-1.80 | 2.47-2.52 | 1.23-1.28 | 0.97-1.02 | 0.97-1.02 | 0.97-1.02 |
| Active Wear Gas | 1.39-1.44 | 2.47-2.52 | 1.38-1.43 | 1.15-1.20 | 1.15-1.20 | 1.15-1.20 |
| Delicate Gas | 2.47-2.52 | 2.07-2.12 | 0.94-0.99 | 0.94-0.99 | 0.94-0.99 | 0.94-0.99 |
| Speed Dry Gas | 1.31-1.36 | 2.47-2.52 | 0.84-0.89 | 0.84-0.89 | 0.35-0.40 | 0.35-0.40 |

The values in Table (2) are approximate and are not restricted to be the determinate values: in the same manner, value ranges are set because these also vary according to the characteristics of each type of dryer machine. Only certain types of cycles are set forth as examples, however, it should be noted that this table applies to all types of cycles and for both electric and gas dryers. The values in Table (2) are values previously calculated by the inventors and by the holder of the present invention.

So that, in a manner exclusively set forth as an example and with the purpose of showing in a more detailed form the calculation of "Additional Time" previously mentioned, it such that: supposing that a drying cycle takes place according to the present invention in an electric dryer, where the cycle type selected is a "Mixed Load", it is also required that the "Less Dry" cycle level be selected (equivalent to "low"), it is also determined that the restriction be "Small load" and that the load indeed be "small", consequently, according to Tables (1) and (2) shown above and as a function of said data previously determined, the "Additional Time" is calculated according to the previous Equation (1) and through the following operation:

$$T_{additional} = \max\{(1.25) \times [=34(1.05-1)+2]T\text{minimum}-\text{Trtv}\}$$

So that:

$$T_{additional} = \max\{(1.25) \times [=1.7+2]T\text{minimum}-\text{Trtv}\}$$

And so:

$$T_{additional} = \max(2.125; T\text{minimum}-\text{Trtv})$$

Afterwards, within said method, the minimum time 200 is compared against the Trtv. If the T additional≤or the T minimum≥T additional then the greater is used in the calculation.

Afterwards it is determined 210 whether the time lapsed is lesser than the total time of objective drying. If the time lapsed is lesser than the total time of objective drying, a target voltage value attained is returned and the additional time according to equation (2) is added 220:

$$T_{objective} = T_{Additional} + T_{lapsed}$$

Thereafter, the target total drying time is reached 230 and the cycle ends 240.

If the time lapsed is not less than the objective time at 210, a value of an attained objective drying time is returned and the cycle ends 240.

If from the comparison of the Target voltage and the Filtered voltage it is established that the Filtered voltage is lesser than the Target voltage, then it is determined if Maximum time has lapsed. If Maximum time has lapsed, then a value of the objective drying time attained is returned. If the Maximum time has not lapsed, a null value at the beginning of the cycle is returned.

The calculations take place by means of the processor 90. The calculation results can be stored in the ROM 70.

Alterations of the structure described in the present can be foreseen by those experts in the area. However, it should be understood, that the present description is described with the preferred embodiments of the invention, which is merely for illustrative purposes only, and should not be construed as a limitation of the invention. All the modifications which do not depart in spirit from the invention are included within the body of the annexed claims.

The invention claimed is:

1. A method to compensate drying time in a drying cycle of an appliance for drying clothing articles, the appliance comprising a processor including an electronic control, a motor responsive to the electronic control to rotationally drive a dram arranged to receive the clothing articles, a heater to supply heated air to the drum, a moisture sensor to provide a moisture signal to the processor indicative of the moisture content of the clothing articles, and a memory to store values and a range of values, the electronic control being further configured to measure time, the method comprising:
   A. reading with the processor data indicative of a plurality of operator-selected parameters;
   B. measuring with the electronic control time elapsed between an initializing time and a target time;
   C. determining data indicative of a load weight within the drum and at least one type of restriction of the appliance;
   D. determining with the processor a range of values for a dryness target voltage by way of a table of predetermined values corresponding to said read and determined data;
   E. storing in the memory the values of the dryness target voltage;
   F. detecting with the moisture sensor a raw dryness voltage and comparing the detected dryness voltage relative to the range of values for the dryness target voltage;
   G. calculating with the processor an additional time as a function of a heat factor and a result of the comparing of the detected raw dryness voltage relative to the range of values for the dryness target voltage, wherein the calculating of the additional time is based on the following equation:

$$T\text{additional} = \max\{(\text{Heat Factor}) \times [\text{Trtv}(\text{Multiplier}-1)+\text{Aggregate}]; T\text{minimum}-\text{Trtv}\},$$

wherein Tadditional presents the additional time, Heat Factor represents the heat factor, Trtv represents the target time, Multiplier represents a predetermined numerical value, aggregate represents a predetermined aggregate time value and Tminimum represents a minimum drying time value; and
   H. adding the additional time to the target time as compensation time for the drying cycle.

2. A method to compensate drying time in a drying cycle of an appliance for drying clothing articles, the appliance comprising a processor including an electronic control, a motor responsive to the electronic control to rotationally drive a drum arranged to receive the clothing articles, a heater to supply heated air to the drum, a moisture sensor to provide a moisture signal to the processor indicative of the moisture content of the clothing articles, and a memory to store values and a range of values, the electronic control being further configured to measure time, the method comprising:
   A. detecting with the moisture sensor a raw dryness voltage and comparing the detected raw dryness voltage relative to a range of values for a dryness target voltage;
   B. calculating with the processor an additional time as a function of a heat factor, wherein the calculating of the additional time is based on the following equation:

$$T\text{additional} = \max\{(\text{Heat Factor}) \times [\text{Trtv}(\text{Multiplier}-1)+\text{Aggregate}]; T\text{minimum}-\text{Trtv}\},$$

wherein Tadditional represents the additional time, Heat Factor represents the heat factor, Trtv represents a target time, Mulitiplier represents a predetermined numerical value, Aggregate represents a predetermined aggregate time value and Tminimum represents a minimum drying time value;
   C. comparing with the processor a the minimum drying time value relative to the additional time and selecting the greater value; and
   D. adding the selected greater value to the target time as compensation time for the drying cycle.

3. The method of claim 2 comprising prior to the step of detecting:

reading with the processor data indicative of a plurality of operator-selected parameters;

measuring with the electronic control time elapsed between an initializing time and a target time;

determining with the processor data indicative of a load weight within the drum and at least one type of restriction of the dryer;

determining a range of values for a dryness target voltage and a minimum drying time value by way of a table of predetermined values based on said read and determined data;

storing the values of the dryness target voltage and the minimum drying time in a memory;

detecting a dryness voltage and comparing the detected dryness voltage relative to the range of values for the dryness target voltage, wherein the calculating step comprises calculating the additional time as a function of the heat factor and a result of the comparing of the detected dryness voltage relative to the range of values for the dryness target voltage.

4. An appliance for drying clothing articles, the appliance comprising:

a processor comprising an electronic control;

a motor responsive to the electronic control to rotationally drive a drum arranged to receive the clothing articles;

a heater to supply heated air to the drum, the heater being controlled by the processor;

a moisture sensor to detect a raw dryness voltage, the moisture sensor being coupled to the processor; and a memory to store values and a range of values, the memory being coupled to the processor, wherein the processor compares the detected raw dryness voltage to a range of values for a dryness target voltage, calculates an additional time as a function of a heat factor, compares a minimum drying time value relative to the additional time, selects the greater value, and adds the selected greater value to a target time as compensation time for the drying cycle, wherein the calculation of the additional time is based on the following equation:

$$T\text{additional} = \max\{(\text{Heat Factor}) \times [\text{Trtv}(\text{Multiplier}-1) + \text{Aggregate}]; T\text{minimum} - \text{Trtv}\},$$

wherein Tadditional represents the additional time, Heat Factor represents the heat factor, Trtv represents the target time, Multiplier represents a predetermined numerical value, Aggregate represents a predetermined aggregate time value and Tminimum represents a minimum drying time value.

5. The appliance of claim 4, wherein the processor further:

reads data indicative of a plurality of operator-selected parameters, measure time elapsed between an initializing time and a target time, determines data indicative of a load weight within the drum and at least one type of restriction of the appliance, and determines a range of values for a dryness target voltage and a minimum drying time value by way of a table of predetermined values based on said read and determined data, wherein the calculation of the additional time is based on the heat factor and a result of the comparison of the detected dryness voltage relative to the range of values for the dryness target voltage.

* * * * *